United States Patent
Li et al.

(10) Patent No.: US 11,258,570 B2
(45) Date of Patent: Feb. 22, 2022

(54) JOINT OPTIMIZATION OF BANDWIDTH PART, SEARCH SPACE AND CONNECTED MODE DISCONTINUOUS RECEPTION OPERATION IN 5G NEW RADIO

(71) Applicant: Apple Inc., Cupertino, CA (US)

(72) Inventors: Yang Li, Plano, TX (US); Yuchul Kim, Santa Clara, CA (US); Zhu Ji, San Jose, CA (US); Beibei Wang, Cupertino, CA (US); Jia Tang, San Jose, CA (US); Wei Zeng, San Diego, CA (US); Dawei Zhang, Saratoga, CA (US); Johnson O. Sebeni, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/590,742

(22) Filed: Oct. 2, 2019

(65) Prior Publication Data
US 2020/0195410 A1    Jun. 18, 2020

Related U.S. Application Data

(60) Provisional application No. 62/779,392, filed on Dec. 13, 2018.

(51) Int. Cl.
*H04W 72/04*    (2009.01)
*H04L 5/00*    (2006.01)
(Continued)

(52) U.S. Cl.
CPC .......... *H04L 5/0092* (2013.01); *H04L 1/1819* (2013.01); *H04W 24/08* (2013.01);
(Continued)

(58) Field of Classification Search
None
See application file for complete search history.

(56) References Cited

U.S. PATENT DOCUMENTS

| | | |
|---|---|---|
| 10,735,078 B2 | 8/2020 | Ly et al. |
| 2018/0220345 A1 | 8/2018 | Moon et al. |

(Continued)

FOREIGN PATENT DOCUMENTS

| | | |
|---|---|---|
| WO | 2018143727 A1 | 8/2018 |
| WO | 2020068253 A2 | 4/2020 |

OTHER PUBLICATIONS

Samsung, "On Bandwidth Part Operation," 3GPP Draft, R1-1716019, 3rd Generation Partnership Project (3GPP), Mobile Competence Centre; 650, Route Des Lucioles; F-06921 Sophia-Antipolis Cedex; France, vol. RAN WG1, No. Nagoya, Japan; Sep. 18, 2017-Sep. 21, 2017, Sep. 17, 2017, XP051339478, five pages.

(Continued)

*Primary Examiner* — Willie J Daniel, Jr.
(74) *Attorney, Agent, or Firm* — Kowert, Hood, Munyon, Rankin & Goetzel, P.C.

(57) ABSTRACT

Apparatuses, systems, and methods for a user equipment device (UE) to perform a method using a status change of a timer associated with a connected mode discontinuous reception (CDRX) communication session with a base station to trigger a switch from using a first bandwidth part (BWP) to a second BWP as the active BWP for the CDRX communication session. The timer may be an on-duration timer, an inactivity timer, or a retransmission timer. The UE may also alter a monitoring schedule of a physical downlink control channel (PDCCH) in response to detecting the status change of the timer. The second BWP may have a wider or narrower bandwidth than the first BWP, depending on the type of timer and the type of status change.

20 Claims, 8 Drawing Sheets

(51) Int. Cl.
  *H04W 76/28* (2018.01)
  *H04L 1/18* (2006.01)
  *H04W 24/08* (2009.01)
  *H04W 56/00* (2009.01)
(52) U.S. Cl.
  CPC ....... *H04W 56/001* (2013.01); *H04W 72/042* (2013.01); *H04W 76/28* (2018.02)

(56) References Cited

U.S. PATENT DOCUMENTS

2019/0149380 A1* 5/2019 Babaei .................... H04L 5/001
                                                              370/330
2019/0281652 A1   9/2019 Zhang et al.

OTHER PUBLICATIONS

Samsung, "On Bandwidth Part Operation," 3GPP Draft, R1-1717675 on Bandwidth Part Operation, 3rd Generation Partnership Project (3GPP), Mobile Competence Centre; 650, Route Des Lucioles; F-06921 Sophia-Antipolis Cedex; France, vol. RAN WG1, No. Prague, Czech Republic Oct. 9, 2017-Oct. 13, 2017, Oct. 8, 2017, XP051340860, eight pages.

Samsung, "On Bandwidth Part Operation," 3GPP Draft, R1-1720349 on Bandwidth Part Operation, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 27, 2017-Dec. 1, 2017, Nov. 17, 2017, XP051368968, five pages.

Extended European Search Report, Application No. 19215666.6-1231, dated Apr. 20, 2020, 12 pages.

* cited by examiner

| | UE-specific BWP/CORESET/search space configuration | Trigger Conditions | | |
|---|---|---|---|---|
| | | onDurationTimer | inactivityTimer | retransmissionTimer |
| CDRX Configuration 1 (e.g., video/ eMBB) | BWP1 (10MHz, continuous PDCCH monitor) | Y | N | N |
| | BWP2 (100MHz, PDCCH monitor period K1ms) | Y | Y | - |
| | BWP3 (5MHz, PDCCH monitor period K2ms) | N | N | Y |
| CDRX Configuration 2 (e.g., VoLTE/ delay-sensitive) | BWP1 (5MHz, continuous PDCCH monitor) | Y | N | N |
| | BWP2 (5MHz, PDCCH monitor period K3ms) | Y | Y | - |
| | BWP3 (1.4MHz, continuous PDCCH monitor) | N | N | Y |

FIG. 6

|  | Timer | Trigger Conditions | | |
|---|---|---|---|---|
|  |  | onDurationTimer | inactivityTimer | retransmissionTimer |
| BWP 1 | Timer 1 (10 slots) | Y | N | N |
|  | Timer 2 (20 slots) | Y | Y | - |
| BWP 2 | Timer 1 (4 slots) | Y | N | N |
|  | Timer 2 (10 slots) | Y | Y | - |
|  | Timer 3 (10 slots) | N | N | Y |

*FIG. 7*

|  | Search space configuration | Trigger Conditions | | |
|---|---|---|---|---|
|  |  | onDurationTimer | inactivityTimer | retransmissionTimer |
| BWP 1 | Search space set 1 | - | N | N |
|  | Search space set 2 | Y | Y | - |
| BWP 2 | Search space set 1 | Y | N | N |
|  | Search space set 2 | Y | Y | - |
|  | Search space set 3 | N | N | Y |

*FIG. 8*

JOINT OPTIMIZATION OF BANDWIDTH PART, SEARCH SPACE AND CONNECTED MODE DISCONTINUOUS RECEPTION OPERATION IN 5G NEW RADIO

PRIORITY CLAIM

This application claims priority to U.S. Provisional Patent Application No. 62/779,392, titled "Joint Optimization of Bandwidth Part, Search Space and Connected Mode Discontinuous Reception Operation in 5G New Radio" and filed on Dec. 13, 2018, which is hereby incorporated by reference in its entirety, as though fully and completely set forth herein.

FIELD

The present application relates to wireless devices, and more particularly to apparatus, systems, and methods for a wireless device to dynamically switch an active bandwidth part and monitoring protocol based on timer activity.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Long Term Evolution (LTE) has become the technology of choice for the majority of wireless network operators worldwide, providing mobile broadband data and high-speed Internet access to their subscriber base. LTE defines a number of downlink (DL) physical channels, categorized as transport or control channels, to carry information blocks received from media access control (MAC) and higher layers. LTE also defines a number of physical layer channels for the uplink (UL).

A proposed next telecommunications standard moving beyond the current International Mobile Telecommunications-Advanced (IMT-Advanced) Standards is called 5th generation mobile networks or 5th generation wireless systems, or 5G for short (otherwise known as 5G-NR for 5G New Radio, also simply referred to as NR). 5G-NR proposes a higher capacity for a higher density of mobile broadband users, also supporting device-to-device, ultra-reliable, and massive machine communications, as well as lower latency and lower battery consumption, than current LTE standards. Further, the 5G-NR standard may allow the available bandwidth used in communication between a base station and a UE to be divided into multiple bandwidth parts (BWP). Consequently, efforts are being made in ongoing developments of 5G-NR to take advantage of the flexibility in BWP allocation in order to further leverage power savings opportunities. According, improvements in the field are desirable.

SUMMARY

Embodiments relate to apparatuses, systems, and methods to construct dynamic hierarchical connected mode discontinuous reception (CDRX) sub-configurations for each of a plurality of bandwidth parts (BWPs) and to dynamically switch an active BWP based on timer activity.

In some embodiments, a UE may dynamically switch an active BWP and/or a monitoring schedule based on timer activity associated with a CDRX communications session.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIG. 6 is a table illustrating two example connected mode discontinuous reception (CDRX) configurations for two different types of traffic, according to some embodiments;

FIG. 7 is a table illustrating two example BWP configurations different BWP timer durations based on timer conditions, according to some embodiments;

FIG. 8 is a table illustrating two example BWP configurations different search space configuration based on time conditions, according to some embodiments.

Figure 1:
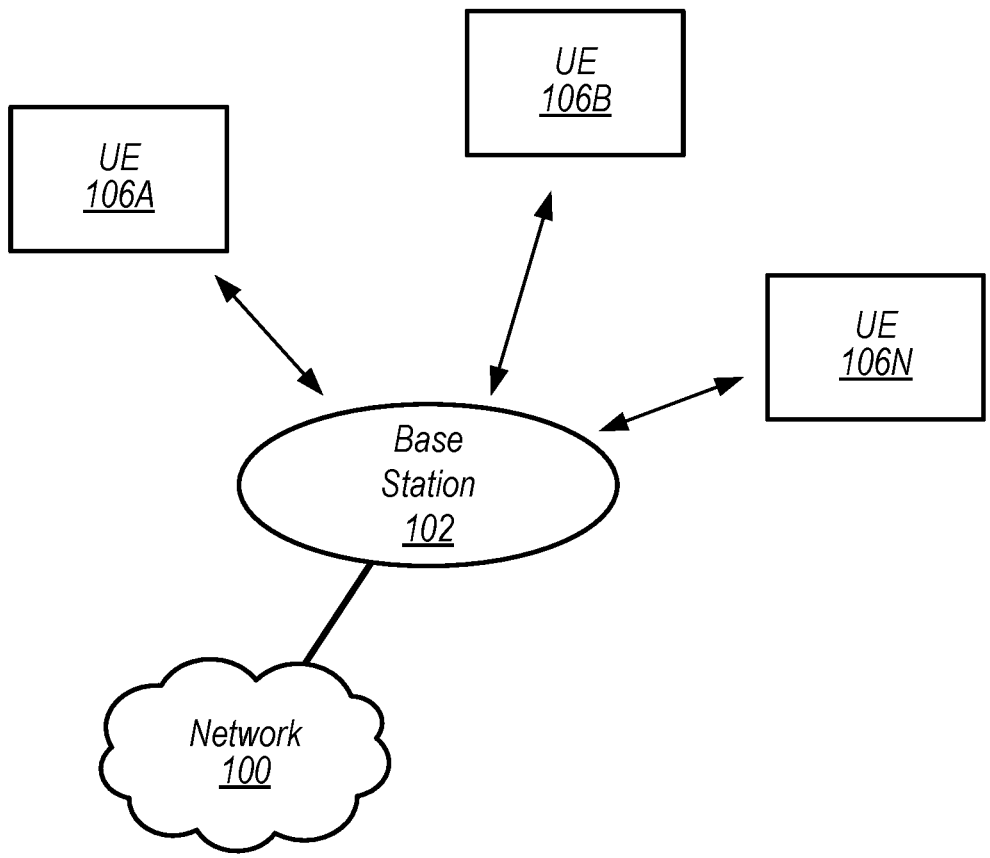
FIG. 1 illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™ Play Station Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
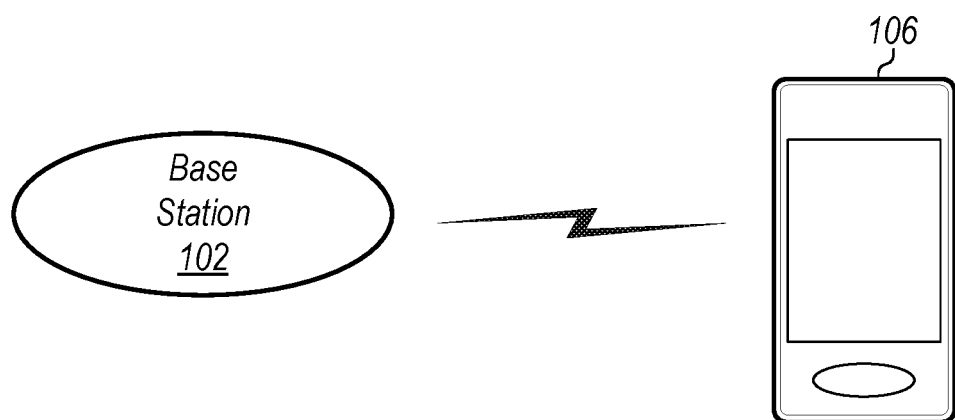
FIG. 2 illustrates a base station (BS) in communication with a user equipment (UE) device according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 3:
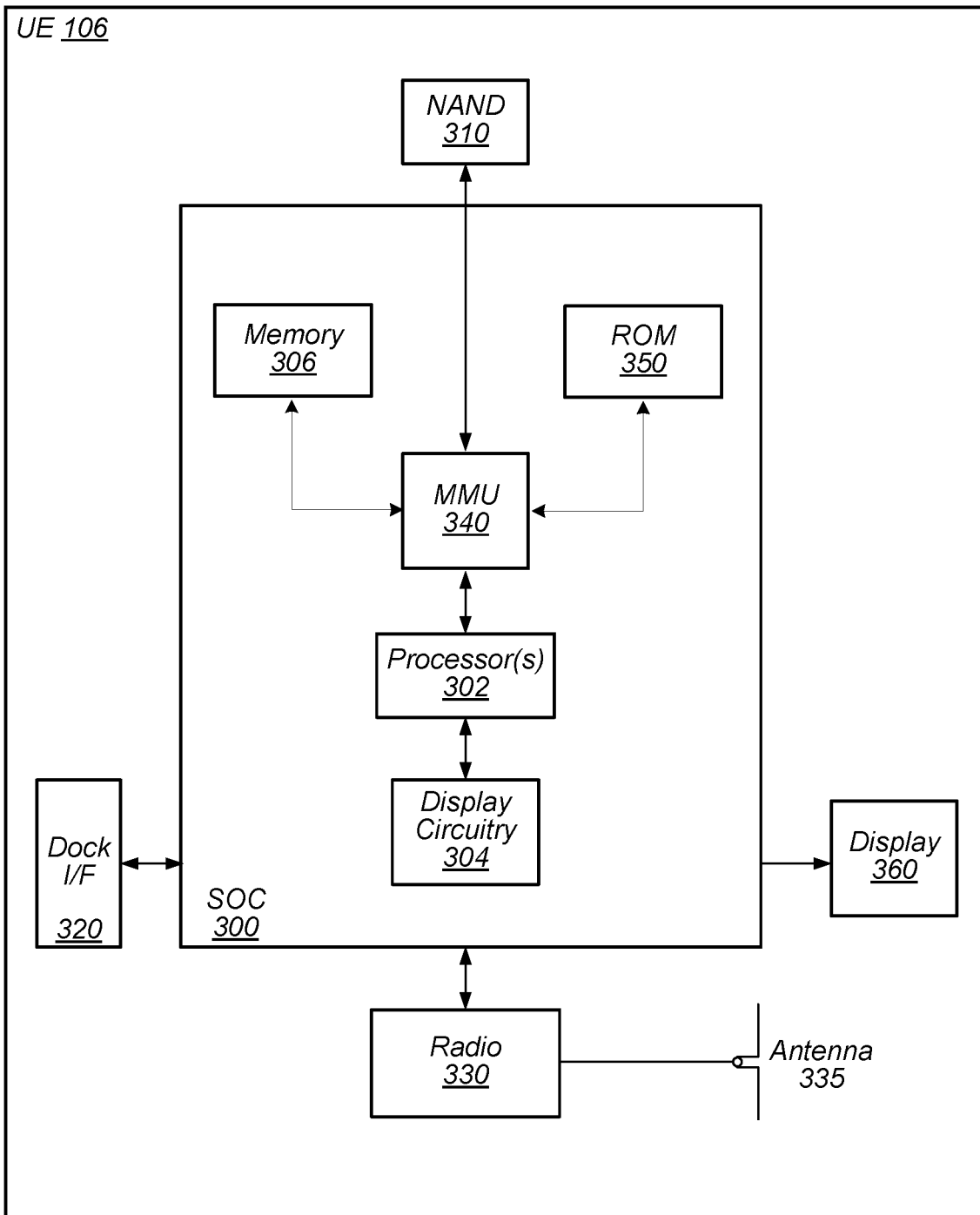
FIG. 3 illustrates an example block diagram of a UE according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antenna 335 as shown. Alternatively, short to medium range wireless communication circuitry may couple (e.g., communicatively; directly or indirectly) to the antenna 335. The short to medium range wireless communication circuitry and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards that include SIM (Subscriber Identity Module) functionality, such as one or more UICC(s) (Universal Integrated Circuit Card(s)) cards.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to perform a method including performing one or more of periodic beam quality measurements and/or event based beam quality measurements, determining, based at least in part on one or more of the periodic beam quality measurements and/or the event based beam quality measurements, a recommended beam quality measurement configuration, and transmitting, to a base station serving the UE, the recommended beam quality measurement configuration. In addition, the UE may perform receiving, from the base station, instructions regarding the beam quality measurement configuration. The instructions may include instructions to activate, deactivate, and/or modify at least one beam quality measurement configuration. In addition, the instructions may be based, at least in part, on the recommend beam quality measurement configuration.

As described herein, the communication device 106 may include hardware and software components for implementing the above features for recommending a beam quality measurement configuration. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 330, 340, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry may each include one or more processing elements. In other words, one or more processing elements may be included in cellular communication circuitry 330 and, similarly, one or more processing elements may be included in short range wireless communication circuitry. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 330. Similarly, the short range wireless communication circuitry may include one or more ICs that are configured to perform the functions of short range wireless communication circuitry. In addition, each integrated circuit may include circuitry (e.g., first circuitry, second circuitry, etc.) configured to perform the functions of short range wireless communication circuitry.

Figure 4:
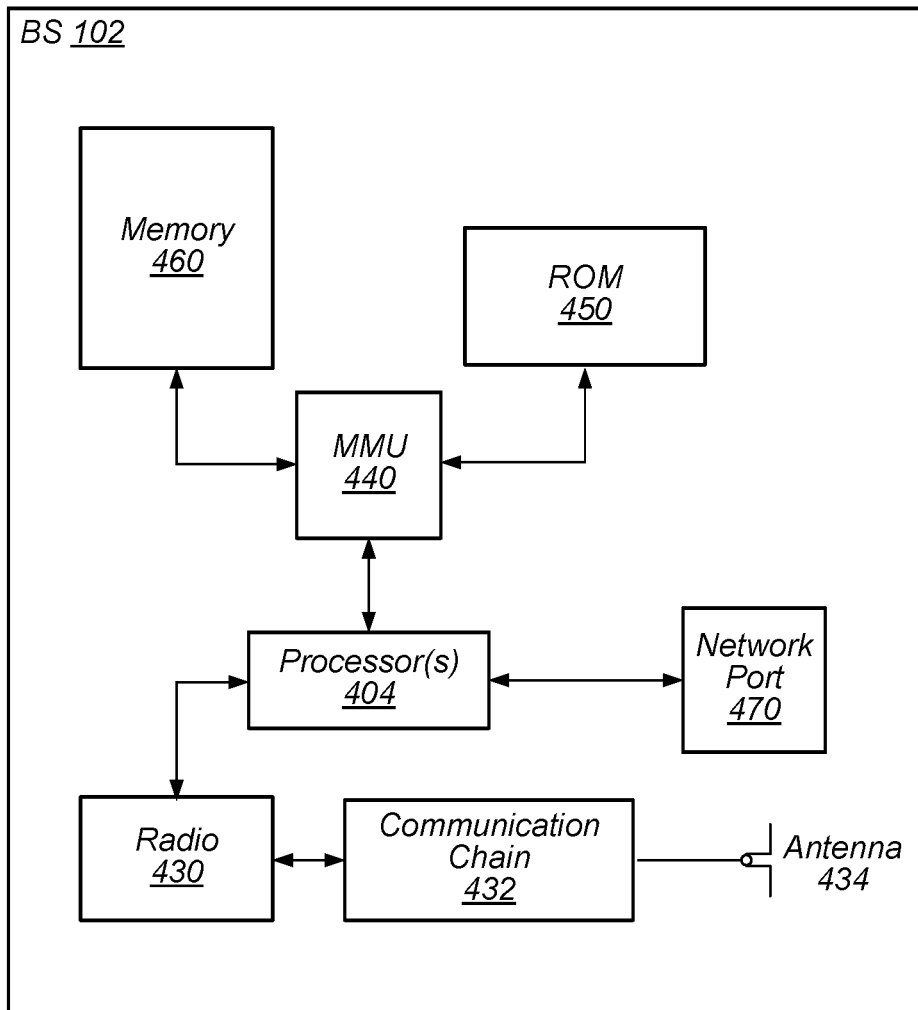
FIG. 4 illustrates an example block diagram of a BS according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNB s.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Bandwidth Parts in 5G NR

It is anticipated that 5G NR may partition the available bandwidth for a communication session between a UE and a gNB into multiple bandwidth parts (BWPs). Each of the BWPs may occupy a different bandwidth, and each BWP may overlap or not overlap in frequency with other BWPs. Additionally, each BWP may operate according to a particular numerology, which may differ between BWPs to offer more diverse communication opportunities to the UE. At any given time, only one of the BWPs may be actively used at a time for each of uplink (UL) and downlink (DL), and the BWP being used may be referred to as the active BWP (e.g., there may be a single active UL BWP and a single active DL BWP). The active BWP may switch over time, and the switching between active BWPs may be directed by downlink control information (DCI) messages, and/or it may be based on a timer. For example, when a UE has data to be transmitted, DCI received from the gNB may direct the UE to use a particular BWP as the active BWP for the data transmission. In some embodiments, the UE may switch back to a default active BWP once a timer expires. For example, the UE may initiate a timer upon switching to an active BWP, and the timer may reset after receiving/transmitting DL/UL data on the BWP. Upon expiration of a timer (e.g., if the timer expires and data has not been received or transmitted on the BWP), the UE may switch to another BWP, such as the default BWP. Advantageously, misalignment may be prevented through employment of a timer to switch BWPs. Additionally or alternatively, embodiments herein describe devices and methods for utilizing RRC-based signaling and/or CDRX timers to switch between active BWPs.

When conducting PDCCH grant monitoring, it may be desirable for a UE to operate at the minimum bandwidth BWP that is able to accomplish PDCCH grant monitoring, to save power. It is anticipated that up to 4 BWPs may be configured for 5G NR, and the particular choice of an active BWP may vary according to different specific implementations.

A UE may supply feedback for the active BWP in a preference and beamforming report, but the UE may not supply feedback for inactive BWPs. For example, the UE may not be required/expected to measure/report quality of BWPs that are configured but not yet activated. However, a UE may be expected to perform channel state information (CSI) measurements within its active downlink (DL) BWP.

In some embodiments, a gNB may switch a UE to an active BWP to conduct radio measurements, such as a channel state information reference signal (CSI-RS) on downlink (DL) and/or a sounding reference signal (SRS) on uplink (UL). In general, scheduling these measurements may require additional messaging and power drain. Autonomous measurement by a UE on other configured but non-active BWPs may be difficult and/or not feasible given that the UE may not be informed of CSI-RS scheduling on the particular BWP to be measured, such that it may be advantageous for the network to coordinate the measurements.

In some embodiments, hybrid automatic repeat request (HARQ) signaling may be supported through a BWP transition. For example, when a UE's active BWP is switched, a HARQ retransmission may occur across BWPs. In other words, a HARQ retransmission may occur on a BWP that was recently switched to active based on an earlier transmission on a different active BWP.

Even though channel quality indicators (CQIs), beamforming, and SRS may be reported based on the current active BWP, the measurements may lead to inaccuracies if the active BWP is switched to other active BWPs for data transmission, and the measurements are not updated with sufficient frequency (i.e., if measurements have not been performed since the active BWP was switched). Current implementations may use an outer loop method whereby the gNB may not know the CQI of a particular active BWP, but may probe different transmission parameters (e.g. different frequencies or other parameters such as different modulation coding schemes (MCS) and/or different transport block sizes (TBS)) to determine which parameters give the UE a higher throughput. However, these outer loop methods may take a significant amount of time to converge, thereby increasing network latency.

Some embodiments herein present a systematic design to coordinate active BWP switching for data transmission and channel measurements to reduce overhead on the network and at the UE and gNB.

Control Resource Set (CORESET) and Search Space

In 5G NR, a Control Resource Set (CORESET) may be defined as a set of resource element groups (REGs) with one or more symbol durations under a given numerology within which a UE may attempt to blindly decode downlink control information. In the time domain, a CORESET may have 1, 2, or 3 contiguous OFDM symbols, and a CORESET may be contiguous or non-contiguous in the frequency domain.

It is anticipated that up to three CORESETs may be configured for a BWP in a cell for a UE under 5G NR. Multiple CORESETs may be overlapped in frequency and time for a UE, and multiple search spaces may be associated with a CORESET. In a CORESET, different search spaces (e.g., a common search space and a UE-specific search space) may have different periodicities for a UE to monitor.

The set of PDCCH candidates that are monitored by a UE may be defined in terms of PDCCH search space sets. A search space may define a set of aggregation levels (ALs), a number of PDCCH candidates for each AL, PDCCH monitoring occasions, and/or an RNTI or DCI format to be monitored. As one example, Type 0-PDCCH to Type 3-PDCCH may be used for a common search space, and a UE-specific search space set may be configured by SearchSpace in PDCCH-Config with searchSpaceType=UE-Specific for DCI formats with CRC scrambled by C-RNTI, or CS-RNTI(s).

Each configured DL BWP may include at least one CORESET with a UE-specific search space. As described in greater detail below, the BWP configured as the active BWP, the CORESET, and the search space configured for a UE may be dynamically determined based on CDRX timer activity.

BWP Activation Based on Timer Activity

In LTE, the bandwidth a UE operates at is typically cell-specifically configured or RRC configured. Additionally, the UE may be required to monitor the PDCCH either continuously or according to a CDRX semi-statically configured by RRC protocols. Accordingly, in LTE it may not be possible to dynamically adjust the operation bandwidth and PDCCH monitoring periodicity/pattern, which may result in less than optimal power efficiency in dynamic traffic conditions.

In contrast, it is anticipated that in 5G NR, BWPs may each be associated with a different bandwidth and numerology, and CORESET/search space sets may each be associated with a different PDCCH monitoring periodicity. Therefore, by switching BWPs a UE may dynamically adapt to changing traffic conditions. However, switching the active BWP, CORESET and/or search space set may often incur delays and may require additional control resources from the gNB to implement.

To address these and other concerns, embodiments herein utilizing timer status changes related to a CDRX communication session as a proxy to determine when to change active BWPs, CORESETs, and/or search space sets. CDRX is expected to be supported in 5G NR, and pre-existing timer activity related to an ongoing CDRX communication session may be utilized to time switches between active BWPs and search monitoring configurations. For example, the gNB and the UE may be time-aligned based on the status of different timers in CDRX, and the timers may capture traffic dynamics to some extent and thus may be used to trigger BWP/search space adaptation to reduce UE power consumption and latency.

In some embodiments, CDRX timers and BWP/CORESET/search space configurations may be jointly coordinated according to different configurations for different types of data traffic. For example, depending on the type of data traffic utilized in the CDRX communication session, different configurations for altering BWPs, CORESETs, and/or search space sets based on timer status changes may be implemented.

Figure 5:
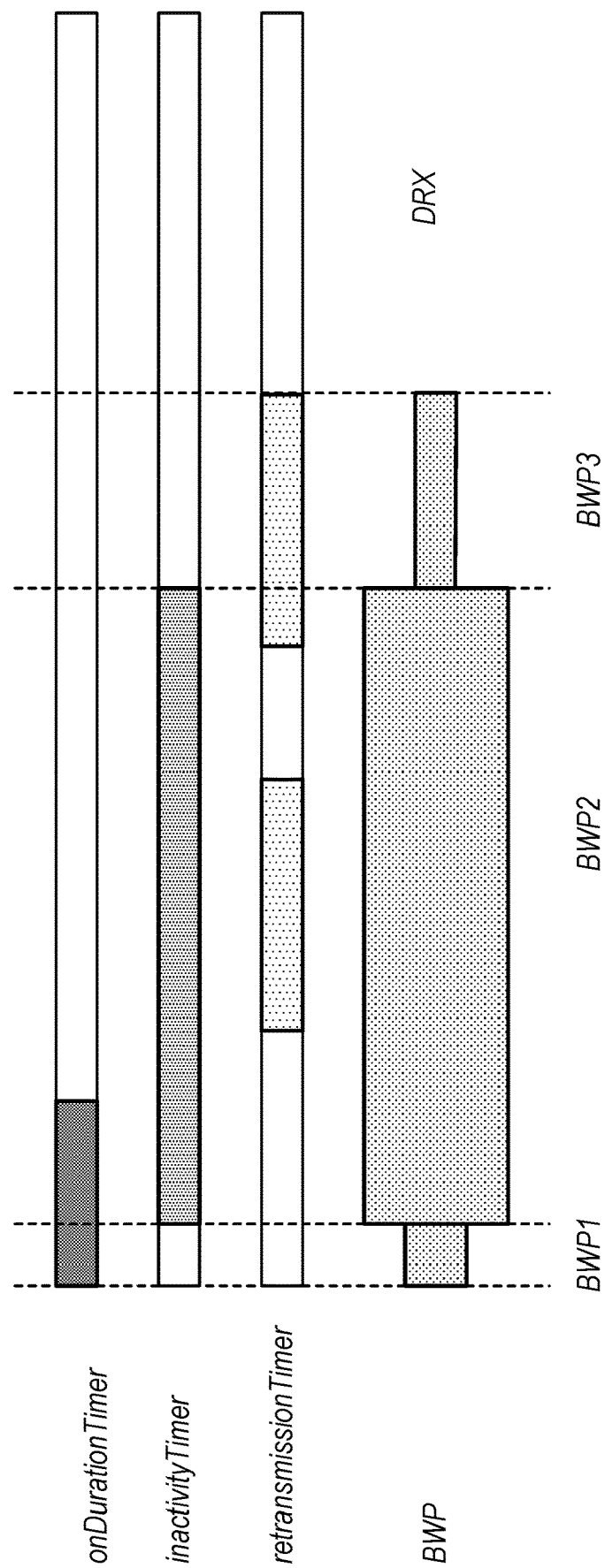
FIG. 5 is an illustration of transitioning between different active BWPs in response to timer activity, according to some embodiments.

FIG. 5—Switching Active BWP Based CDRX Timer Activity

FIG. 5 is a schematic diagram illustrating an autonomous method for switching the active BWP based on CDRX timer activity. FIG. 5 is intended to illustrate one particular example, and is not intended to be limiting to the disclosure as a whole. In various embodiments, the UE and gNB may autonomously switch one or more of the active BWP, CORESET and search space upon different status changes to various CDRX timers. The triggered switch or adjustment may result in at least a change of bandwidth, or PDCCH monitoring periodicity or duration. Status changes to different CDRX timers may capture traffic dynamics to some extent and may be used to adjust PDCCH monitoring behavior.

FIG. 5 illustrates three types of timers associated with a CDRX communication session. The on-duration timer may be initiated when a CDRX communication session is initiated, and upon expiration of the on-duration timer, the UE may be triggered to go to sleep (i.e., to enter a DRX sleep state) if no other timer is running upon expiration of the on-duration timer. The inactivity timer may be triggered to initiate each time a new grant is received, and may be refreshed upon each new grant. Thus, expiration of the inactivity timer may indicate that no new grant has been received during the expiry period of the inactivity timer, suggesting that the UE may not expect to receive many new grants in the near future. Finally, the retransmission timer may initiate when a DL grant is received but reception has failed. The retransmission timer may set a period of time to wait for a retransmission of the failed DL grant.

In the example illustrated in FIG. 5, the UE may be triggered to utilize a medium bandwidth BWP (BWP1) when an on-duration timer is initiated. In some embodiments, the periodicity associated with PDCCH search space monitoring may be continuous while using BWP1 as the active BWP.

As illustrated, when the inactivity timer starts (for example, this may occur when the UE detects a new PDSCH/PUSCH grant or the gNB sends new grants), the UE may automatically switch the active BWP to BWP2, which has a wider bandwidth than BWP1 and may have similar or different periodicity, to accommodate possible upcoming traffic related to the initiated inactivity timer.

Upon expiration of the inactivity timer, the UE may autonomously switch to a third active BWP (BWP3) with a narrow bandwidth, with similar or different PDCCH monitoring periodicity. For example, expiration of the inactivity timer may be correlated with a slowing down of data traffic, such that the UE may not need to utilize the wide bandwidth of BWP2. The UE may further base the decision to switch to BWP3 as the active BWP based on a determination that, upon expiration of the inactivity timer, the only currently pending timer associated with the CDRX connection is a retransmission timer. For example, because only the retransmission timer is still running, the UE may likely only be expecting a retransmission packet (e.g., with narrow bandwidth requirements), so that the UE and the gNB may preserve energy resources by switching to the narrowband BWP3.

Finally, upon expiration of the retransmission timer, if no timers are active with respect to the CDRX communication session, the UE may enter a DRX sleep state to preserve power, where the UE does not have an active BWP in the DRX sleep state.

Note that each of BWP1, BWP2, and BWP3 are illustrated schematically in FIG. 5, where the height of each BWP is indicative of the bandwidth of the BWP. However, each of the three BWPs may have the same or separate center-band frequencies, and may reside at overlapping or non-overlapping frequency ranges, according to various embodiments.

FIG. 6—Conditions for Transitioning Between CDRX Configurations

FIG. 6 is a table illustrating two example CDRX configurations for transitioning between different active BWPs and PDCCH monitoring protocols depending on timer trigger conditions, for two different types of data traffic. For each CDRX configuration, at least one UE-specific search space may be attached to a CORESET in a preferable BWP.

The UE may autonomously switch between different active BWPs depending on the state of various CDRX timers. A delay that may be incurred while switching between active BWPs may be accounted for through a predefined value known to both the gNB and the UE.

As illustrated in FIG. 6, a first CDRX configuration (CDRX configuration 1) may be used for video and enhanced mobile broadband (eMBB) data traffic. For CDRX configuration 1, a UE may be triggered to use BWP1 as the active BWP when the on-duration timer is running but no other CDRX timer is running, where BWP1 has a 10 MHz bandwidth and continuously monitors the PDCCH. In CDRX configuration 1, when both the on-duration timer and the inactivity timer are running, the UE may switch to BWP2, with a wideband 100 MHz bandwidth and where the UE periodically monitors the PDCCH with a first predetermined period. Finally, if both the on-duration timer and the inactivity timer are not running (e.g., if they have both expired) and only the retransmission timer is running, the UE may use BWP3 as the active BWP with a very narrowband 5 MHz bandwidth and where the UE periodically monitors the PDCCH with a second predetermined period.

As further illustrated in FIG. 6, a second CDRX configuration (CDRX configuration 2) may be used for voice-over LTE (VoLTE) and/or other delay sensitive traffic types. As illustrated, the same timer triggers may be used to select three different BWPs to use as the active BWP, with different configurations for continuous and/or periodic PDCCH monitoring, as desired. FIG. 6 is intended for illustrative purposes, and is not intended to limit the scope of the described embodiments in any way. For example, further types of data traffic may be configured with additional CDRX configurations, where different types of BWPs and/or PDDCH monitoring schedules may be employed for different timer status change triggers, as desired. Alternatively, in some embodiments, timer status change triggers may cause the UE to keep the same BWP, but the search space and/or PDCCH monitoring schedule may be switched autonomously.

FIG. 7—Conditions for Switching Bandwidth Part Timers

FIG. 7 is a table illustrating two example BWPs that may be configured with a customized timer depending on CDRX timer conditions, according to some embodiments. In some embodiments, a timer may be configured for a first BWP whereby, when the timer expires after the first BWP has been configured as the active BWP, the UE may automatically switch from the first BWP to a default BWP as the active BWP. In other words, BWPs may be configured to activate for a predetermined duration of time, and a default BWP may be reactivated upon expiration of this duration of time. In some embodiments, the default BWP may be a narrowband BWP that is preferable for low traffic conditions.

In these embodiments, the first BWP may be configured with a different BWP timer duration depending on the prevailing CDRX timer trigger conditions that exist when the first BWP is activated. The UE may automatically select the appropriate BWP timer duration while activating a BWP depending on the CDRX timer conditions. Advantageously, these embodiments may add flexibility to BWP activation to adapt to dynamic traffic patterns and conditions.

As illustrated, for a first BWP (BWP 1), the presence of an actively running on-duration timer but neither an inactivity timer nor a retransmission timer may result in BWP 1 utilizing a 10 slot BWP timer. Alternatively, if both the on-duration timer and the inactivity timer are actively running, BWP may utilize a lengthened BWP timer with a 20 slot duration.

The lower half of the table illustrated in FIG. 7 shows an alternative embodiment for configuring a second BWP (BWP 2) with a set of three timer durations. In the illustrated embodiment, initiation of an on-duration timer while neither an inactivity timer or a retransmission timer are running may cause the device to configure BWP 2 as the active BWP with a first timer duration of 4 slots. The duration of 4 slots is presented as an example, and more broadly the timer duration may be selected to be at least as long as the duration of the on-duration timer. For example, it may be desirable for BWP 2 to remain the active BWP as long as the on-duration timer is still running, such that the first BWP timer may be set to a duration equal to or slightly longer than the on-duration timer. In other words, the first BWP timer duration may be selected based on the on-duration timer duration.

If the device detects that both the on-duration timer and the inactivity timer have been initiated (e.g., if the on-duration timer was running, and the device detects that the inactivity timer has additionally been initiated) while the retransmission timer is not running, the device may select a second BWP timer duration for BWP 2 (e.g., a duration of 10 slots in the illustrated example). While a duration of 10 slots is selected as one example, more broadly, the second BWP timer duration may be selected to be longer than the first BWP duration to accommodate upcoming traffic and allow scheduling flexibility.

Finally, if the device detects that neither the on-duration timer or the inactivity timer are running but the retransmission timer has been initiated, a third BWP timer duration may be selected for BWP 2 (e.g., a duration of 10 slots in the illustrated example). While a duration of 10 slots is selected as one example, more broadly, the third BWP timer duration may be selected to be equal to or slightly greater than the duration of the retransmission timer. In other words, the third BWP timer duration may be selected based on the retransmission timer duration.

Note that these embodiments may exist concurrently with other embodiments described herein. For example, during a particular CDRX timer condition of the table illustrated in FIG. 6 (i.e., a particular row in the table of FIG. 6), the UE may switch to the indicated BWP (e.g., BWP1, BWP2, or BWP3) according to the timer duration indicated in FIG. 7.

FIG. 8—Conditions for Switching Search Space Sets

FIG. 8 is a table illustrating two example BWPs that may be configured to utilize different search space configurations (e.g., different search space sets) depending on CDRX timer conditions, according to some embodiments. Different search space sets may implement one or more customized parameters for performing physical downlink control channel (PDCCH) monitoring, such as a monitoring periodicity, a PDCCH monitoring pattern (e.g., a number and/or location of monitoring symbols within a slot), a number of PDCCH candidates per control channel element (CCE) aggregation level L (e.g., the aggregation level may be 1, 2, 4, or 8, in some embodiments), and/or a search space type (e.g., whether the search space is a common search space set or a UE-specific search space set).

In some embodiments, if the CDRX timer activity suggests that the UE is experiencing light traffic (e.g., if neither the inactivity timer nor the retransmission timer are running), a UE may be able to save power by utilizing a BWP with a search space set that incorporates power saving parameters. For example, in response to determining that neither the inactivity timer nor the retransmission timer are running, the UE may activate BWP 1 with search space set 1, where search space set 1 utilizes one or more power saving parameters, such as a lower monitoring bandwidth, a longer monitoring periodicity, a more sparse PDCCH monitoring pattern, a lower number of PDCCH candidates per CCE aggregation level, and/or a search space type with lower power consumption.

Alternatively, if the CDRX timer activity suggests that the UE is experiencing heavy traffic (e.g., if the inactivity timer is running), the UE may activate a BWP with search space set 2 that implements enhanced monitoring parameters. For example, search space set 2 may utilize an expanded search space to facilitate gNB scheduling flexibility. Search space set 2 may additionally or alternatively utilize one or more of a shorter monitoring periodicity, a more dense PDCCH monitoring pattern, a larger number of PDCCH candidates per CCE aggregation level, and/or a higher power search space type with higher power consumption.

As further illustrated in FIG. 8, BWP 2 may utilize three different types of search space set, depending on the CDRX timer status. As illustrated, an additional search space set 3 may be utilized when neither the on-duration timer nor the inactivity timer is running, but the retransmission timer is running. Search space set 3 may have intermediate power consumption between search space sets 1 and 2, in some embodiments.

Association Between Spatial Domain and CDRX/BWP Timers

In some embodiments, CDRX and/or BWP timer conditions may be utilized to govern spatial antenna parameters of a UE device. For example, since CDRX timer status may be used as a proxy for dynamic aspects of traffic (e.g., heavy vs. light traffic), CDRX timer status information may be used to adapt spatial domain operation of the UE, including one or more of a number of antennas used for reception, a number of beams used for performing sweeps and/or monitoring (e.g., synchronization signal block (SSB) beams or channel state information (CSI-RS) beams, among other possibilities), and/or a frequency of reporting channel conditions to the base station (e.g., channel quality indicators (CQIs), precoding matrix indicators (PMIs), and/or rank indicators (RI) among other possibilities).

Advantageously, the measurement frequency, reporting frequency, and/or MIMO capability may be reduced when the traffic is low as inferred from CDRX timers, in some embodiments.

Autonomous Switching in 5G NR UL HARQ Monitoring

The following paragraphs describe example embodiments where utilizing CDRX timer status triggers to switch active BWPs and/or monitoring schedules may be used to improve HARQ monitoring performance in a 5G NR communication system.

In LTE, when a UE is configured with CDRX, it may enter a DRX sleep state when, for example, one or more of an on-duration, inactivity, or retransmission timer expires. If a pending PUSCH message is awaiting an acknowledgment message, the UE may only need to wake up during a specific subframe to monitor a Physical Channel Hybrid Automatic Repeat Request (HARQ) Indicator Channel (PHICH) for an acknowledgment message, and the subframes may be periodically spaced a predetermined distance apart (e.g., 8 ms or another duration of time apart).

In contrast, in 5G NR, it is anticipated that the PHICH may be removed and UL HARQ messaging may be asynchronous. In downlink control information (DCI) format 0_0 and 0_1 for PUSCH scheduling, 4 bits of a HARQ process may be present to support asynchronous UL HARQ. Because the timeline in 5G NR for UL for frequency division duplexing (FDD) and/or time division duplexing (TDD) communications may be dynamically configured, the synchronous HARQ protocol used in LTE may not be effective for 5G NR. To accommodate an asynchronous UL HARQ protocol in 5G NR, in some embodiments New Data Indicator (NDI) toggling may be used to identify new UL data.

In a typical 5G NR scenario, when a UE is engaged in a DRX connection, the UE may wait for the next on-duration timer to be initiated before receiving a PDCCH that may carry UL HARQ information. However, this may cause an undesirable delay as, for one particular example, the CDRX periodicity may be configured as 40 ms and the next on-duration timer may not start until approximately 30 ms later. Alternatively, the UE may continuously monitor for HARQ messaging until a UL HARQ timer expired, but continuous monitoring consumes higher power than synchronously monitoring in a periodic manner as is typically done in LTE. Accordingly, the power consumption and/or delay incurred to monitor UL HARQ in NR may be much higher than in LTE.

To address these and other concerns, embodiments herein describe methods and devices whereby the UE may save power through early termination and/or reducing the amount of UL HARQ monitoring. This may be beneficial in a CDRX scenario to reduce UL HARQ monitoring in between DRX wakeups, which may allow the UE to enter a lower power state during CDRX sleep. Utilizing a special UL BWP configuration to monitor UL HARQ/grants for particular traffic types (e.g., VoLTE) may reduce UE power consumption and extend battery life.

As one particular example, a UE may be configured with a CDRX with dense periodicity for monitoring the PDCCH (e.g., continuously) and/or a BWP with a large bandwidth. The UE may transmit a PUSCH and subsequently, an inactivity timer may expire (e.g., indicating that the wideband BWP may no longer be necessary, as traffic volume has become sufficiently sparse such that the inactivity timer has expired). The expiration of the inactivity timer may cause the UE to transition to a different active BWP. If the previous transmitted PUSCH has not yet received an acknowledgment message (ACK) when the timer expires, the UE may automatically switch to another BWP with longer periodicity to reduce the time for HARQ monitoring. Upon reception of an ACK on this special BWP, the UE may subsequently enter a DRX sleep state to preserve power, and deactivate the special BWP. Finally, when a next on-duration timer is initiated, the UE may resume communications with the default BWP as the active BWP.

Figure 9:
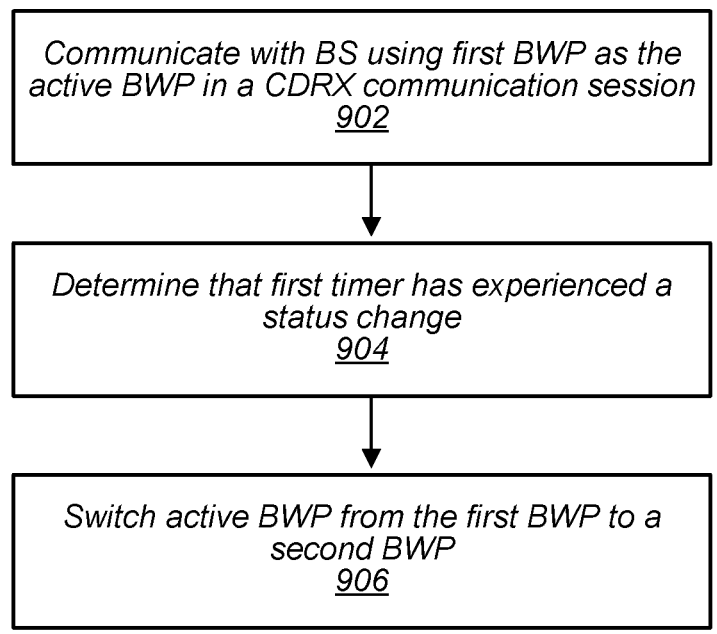
FIG. 9 is a flowchart diagram illustrating a method for switching active BWPs based on a status change of a timer, according to some embodiments.

FIG. 9—Timer-based Switching of Active BWP

FIG. 9 is a flow chart diagram illustrating a method utilizing status changes to one or more timers associated with a CDRX communication session to direct switching between active BWPs, CORESETs, and/or search space sets, according to some embodiments. The scheme shown in FIG. 9 may be used in conjunction with any of the computer systems or devices shown in the above Figures, among other devices. In various embodiments, some of the elements of the scheme shown may be performed concurrently, in a different order than shown, or may be omitted. Additional elements may also be performed as desired. As shown, the scheme may operate as follows.

At 902, a user equipment device (UE) communicates with a base station using a first BWP as an active BWP in a CDRX communication session. In some embodiments, communicating with the base station using the first BWP as the active BWP in the CDRX communication session is performed in response to detection by the UE of initiation of an on-duration timer. For example, initiation of the on-duration timer may trigger the UE to establish the CDRX communication session with the base station using the first BWP as the active BWP.

At 904, the UE may determine that a first timer associated with the CDRX communication session has experienced a status change. In various embodiments, the first timer may be an inactivity timer, an on-duration timer, or a retransmission timer, among other possibilities. The status change may be either the initiation or expiration of the first timer, in some embodiments.

At 906, the UE may switch the active BWP from the first BWP to a second BWP based at least in part on the determination that the first timer has experienced the status change, where the second BWP has a different bandwidth than the first BWP. In some embodiments, in addition to or alternatively to switching from a first to a second active BWP, the UE may switch the schedule and/or duration for monitoring a physical downlink control channel (PDCCH) upon determining that the first timer has experienced the status change. For example, the UE may continuously monitor the PDCCH while the first BWP is the active BWP, and may switch from continuously monitoring the PDCCH to periodically monitoring the PDCCH based at least in part on the determination that the first timer has experienced the status change. Additionally or alternatively, the UE may switch one or more of a control resource set (CORESET) and a search space associated with the CDRX communication session based at least in part on the determination that the first timer has experienced the status change. In some embodiments, switching one or more of the CORESET and the search space associated with the CDRX communication session comprises switching one or more of the monitoring periodicity and duration of the PDCCH.

Advantageously, the UE and the base station may be time synchronized through the timer activity. For example, one or more timers running at the UE may additionally be synchronously running at the base station, such that the base station may also detect a status change to the timer. Accordingly, when the UE switches the active BWP from the first BWP to the second BWP, the base station may also switch from communicating with the UE with the first BWP to the second BWP. For example, a protocol table such as those illustrated in FIGS. 6-8 may be known to both the base station and the UE, such that both the base station and the UE can switch in a coordinated manner between active BWPs and/or PDCCH monitoring schedules or duration based on a timer status change.

For embodiments where the first timer is an inactivity timer and the status change is an initiation of the inactivity timer, the second BWP may have a larger bandwidth than the first BWP. For example, the initiation of the inactivity timer may suggest a high likelihood of heavier upcoming data traffic, such that the UE may benefit from transitioning to a wider bandwidth BWP. Additionally or alternatively, the initiation of the inactivity timer may suggest that periodic monitoring of the PDCCH may be more effective and power efficient than continuously monitoring the PDCCH, and the UE may thereby switch its PDCCH monitoring schedule.

For embodiments where the first timer is an inactivity timer and the status change is an expiration of the inactivity timer, the second BWP may have a smaller bandwidth than the first BWP. For example, the expiration of the inactivity timer may suggest a high likelihood of a reduction in upcoming data traffic volume, such that the UE may preserve power by transitioning to a narrower bandwidth BWP, as the wideband BWP may be no longer necessary. In these embodiments, the UE may further determine that a retransmission timer is running when the inactivity timer expires, and switching the active BWP from the first BWP to the second BWP is further based at least in part on the determination that the retransmission timer is running when the inactivity timer expires. Alternatively, if the UE determines that the retransmission timer is not running when the inactivity timer expires (e.g., if the UE determines that no timer is running when the inactivity timer expires), the UE may enter a DRX sleep state where no active BWP is configured and the UE enters a power saving mode.

In some embodiments, subsequent to switching the active BWP from the first BWP to the second BWP, the UE may determine that a second timer associated with the CDRX communication session has expired. In these embodiments, the UE may enter a DRX sleep state based at least in part on the determination that the second timer has expired. For example, upon expiration of the first timer, a second timer may have still been running, implying that the UE may likely experience reduced data traffic such that a narrowband active BWP is sufficient (e.g., the UE may still be awaiting a retransmission). Upon expiration of the second timer, the UE may conclude that no further data traffic is anticipated, and may enter a sleep state to save power.

In some embodiments, the UE may continue the CDRX communication session after switching to the second BWP as the active BWP. For example, while communicating with the base station using the first BWP as the active BWP, the UE may transmit an uplink message to the base station and monitor for a hybrid automatic repeat request (HARQ) message associated with the transmitted uplink message. In this example, it is possible that the UE detects the status change to the first timer before receiving the HARQ message, such that said switching the active BWP from the first BWP to the second BWP occurs before the UE receives the HARQ message. In these embodiments, subsequent to switching the active BWP from the first BWP to the second BWP, the UE may monitor for the HARQ message using the second BWP.

Alternative Proposal for HARQ Monitoring in NR

In some embodiments, the gNB may support sending DCI messaging to terminate an UL HARQ process early. For example, a special DCI or a bit-field in DL/UL DCI may be used to inform the UE that a previous HARQ is complete. In one example, such DCI messaging may be an UL DCI with NDI toggled but zero resource allocation. For example, toggling the NDI with zero resource allocation may be utilized to indicate that the HARQ process is complete. The DCI may be triggered when the gNB identifies that the UE is in a DRX state and is pending on an UL HARQ monitoring process, in some embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
    by a user equipment device (UE):
        communicating with a base station using a first bandwidth part (BWP) as an active BWP in a connected mode discontinuous reception (CDRX) communication session;
        determining that a first timer has experienced a status change; and
        switching a first search space to monitor and a periodicity of monitoring the first search space in the first BWP based at least in part on the determination that the first timer has experienced the status change.

2. The method of claim 1,
    wherein the first timer is an inactivity timer,
    wherein the status change comprises an initiation of the inactivity timer, and
    wherein the first search space is switched to a search space with enhanced monitoring parameters.

3. The method of claim 1,
    wherein the first timer is an inactivity timer,
    wherein the status change comprises an expiration of the inactivity timer, and
    wherein the first search space is switched to a search space with power saving parameters.

4. The method of claim 3, the method further comprising:
    determining that a retransmission timer is running when the inactivity timer expires, and
    wherein switching the first search space to monitor and the periodicity of monitoring the first search space is further based at least in part on the determination that the retransmission timer is running when the inactivity timer expires.

5. The method of claim 1, the method further comprising:
    subsequent to switching the first search space to monitor and the periodicity of monitoring the first search space, determining that a second timer has expired; and
    transitioning the UE to a DRX sleep state based at least in part on the determination that the second timer has expired.

6. The method of claim 1, the method further comprising:
    by the UE:
        when the first BWP is used as the active BWP, continuously monitoring a physical downlink control channel (PDCCH); and
        switching from continuously monitoring the PDCCH to periodically monitoring the PDCCH based at least in part on the determination that the first timer has experienced the status change.

7. The method of claim 1, the method further comprising:
    based at least in part on the determination that the first timer has experienced the status change, switching a control resource set (CORESET) associated with the CDRX communication session.

8. The method of claim 7,
    wherein switching the CORESET associated with the CDRX communication session comprises switching a monitoring duration of a physical downlink control channel (PDCCH).

9. The method of claim 1,
    wherein communicating with the base station using the first BWP as the active BWP in the CDRX communication session is performed in response to detection by the UE of initiation of an on-duration timer.

10. The method of claim 1, the method further comprising:
    by the UE:
        transmitting an uplink message to the base station and monitoring for a hybrid automatic repeat request (HARD) message associated with the transmitted uplink message while communicating with the base station using the first BWP as the active BWP, wherein said switching the first search space to monitor and the periodicity of monitoring the first search space occurs before the UE receives the HARQ message.

11. The method of claim 1,
    wherein the first timer experiencing the status change is associated with light traffic of the CDRX communication session, and
    wherein the first search space comprises a power saving search space.

12. The method of claim 1,
    wherein the first timer experiencing the status change is associated with heavy traffic of the CDRX communication session, and
    wherein the first search space comprises an enhanced monitoring search space.

13. A user equipment device (UE), comprising:
    an antenna;
    a radio coupled to the antenna; and
    a processing element coupled to the radio;
    wherein the UE is configured to:
        communicate with a base station using a first bandwidth part (BWP) as an active BWP in a connected mode discontinuous reception (CDRX) communication session;
        determine that a first timer has experienced a status change; and
        switch a first search space to monitor and a periodicity of monitoring the first search space in the first BWP based at least in part on the determination that the first timer has experienced the status change.

14. The UE of claim 13,
    wherein the status change of the first timer is associated with light traffic of the CDRX communication session, and
    wherein the first search space comprises a power saving search space.

15. The UE of claim 13,
    wherein the status change of the first timer is associated with heavy traffic of the CDRX communication session, and
    wherein the first search space comprises an enhanced monitoring search space.

16. An apparatus, comprising:
    a processor configured to cause a user equipment device (UE) to:

communicate with a base station using a first bandwidth part (BWP) as an active BWP in a connected mode discontinuous reception (CDRX) communication session;

determine that a first timer has experienced a status change; and switch a first search space to monitor and a periodicity of monitoring the first search space in the first BWP based at least in part on the determination that the first timer has experienced the status change.

17. The apparatus of claim 16, wherein the processor is further configured to cause the UE to:

based at least in part on the determination that the first timer has experienced the status change, switch a control resource set (CORESET) associated with the CDRX communication session, wherein switching the CORESET associated with the CDRX communication session comprises switching the monitoring duration of a physical downlink control channel (PDCCH).

18. The apparatus of claim 16, wherein the first timer is an inactivity timer, wherein when the status change comprises an initiation of the inactivity timer, the first search space is switched to a search space with enhanced monitoring parameters, and wherein when the status change comprises an expiration of the inactivity timer, the first search space is switched to a search space with power saving parameters.

19. The apparatus of claim 16, wherein the first timer experiencing the status change is associated with light traffic of the CDRX communication session, and wherein the first search space comprises a power saving search space.

20. The apparatus of claim 16, wherein the first timer experiencing the status change is associated with heavy traffic of the CDRX communication session, and wherein the first search space comprises an enhanced monitoring search space.

* * * * *

UNITED STATES PATENT AND TRADEMARK OFFICE
CERTIFICATE OF CORRECTION

PATENT NO. : 11,258,570 B2
APPLICATION NO. : 16/590742
DATED : February 22, 2022
INVENTOR(S) : Yang Li et al.

Page 1 of 1

It is certified that error appears in the above-identified patent and that said Letters Patent is hereby corrected as shown below:

In the Claims

Column 22, Line 16, delete "(HARD)" and insert --(HARQ)--.

Signed and Sealed this
Thirtieth Day of May, 2023

Katherine Kelly Vidal
*Director of the United States Patent and Trademark Office*